United States Patent [19]
Bernard et al.

[11] 3,728,514
[45] Apr. 17, 1973

[54] THERMIONIC INSULATED ARC WELDING GUN

[75] Inventors: Arthur A. Bernard, Beecher; Richard A. Bernard, Flossmoor, both of Ill.

[73] Assignee: Bernard Welding Equipment Company, Beecher, Ill.

[22] Filed: Dec. 21, 1970

[21] Appl. No.: 100,518

Related U.S. Application Data

[62] Division of Ser. No. 818,954, April 24, 1969, abandoned.

[52] U.S. Cl. ............219/130, 219/74, 219/136
[51] Int. Cl. ............................B23k 9/00
[58] Field of Search...............219/141, 136, 130, 219/75, 74; 285/133, 138; 287/58; 174/28, 88 C

[56] References Cited

UNITED STATES PATENTS

| 2,842,656 | 7/1958 | Nevvirth | 219/75 |
| 3,510,623 | 5/1970 | Wolgast | 219/138 X |
| 3,265,856 | 8/1966 | Cecil | 219/130 |
| 2,444,767 | 7/1948 | Cobean | 219/75 |
| 3,197,611 | 7/1965 | Morris et al. | 219/130 |
| 2,914,598 | 11/1959 | Spillane | 174/15 |
| 2,386,466 | 10/1945 | Hyde | 174/121 |

FOREIGN PATENTS OR APPLICATIONS

| 1,094,703 | 12/1967 | Great Britain | 219/136 |

*Primary Examiner*—J. V. Truhe
*Assistant Examiner*—George A. Montanye
*Attorney*—James P. Hume et al.

[57] ABSTRACT

Improved means of insulating that portion of an air cooled arc welding gun which extends between the handle portion and the head portion to prevent thermionic emission dense enough to establish the conductance of welding current between it and the weldment, improved means for enclosing the welding current circuit suspended within the handle of the gun within a tube composed of insulating material to reduce the amount of heat radiated from the circuit within the handle, and improved means for suspending a highly heated welding current circuit within the handle to provide space between the wall of the handle bore and the suspended heated circuit for the circulation of cooling air therethrough. Also disclosed is the method of making the improved structure.

4 Claims, 3 Drawing Figures

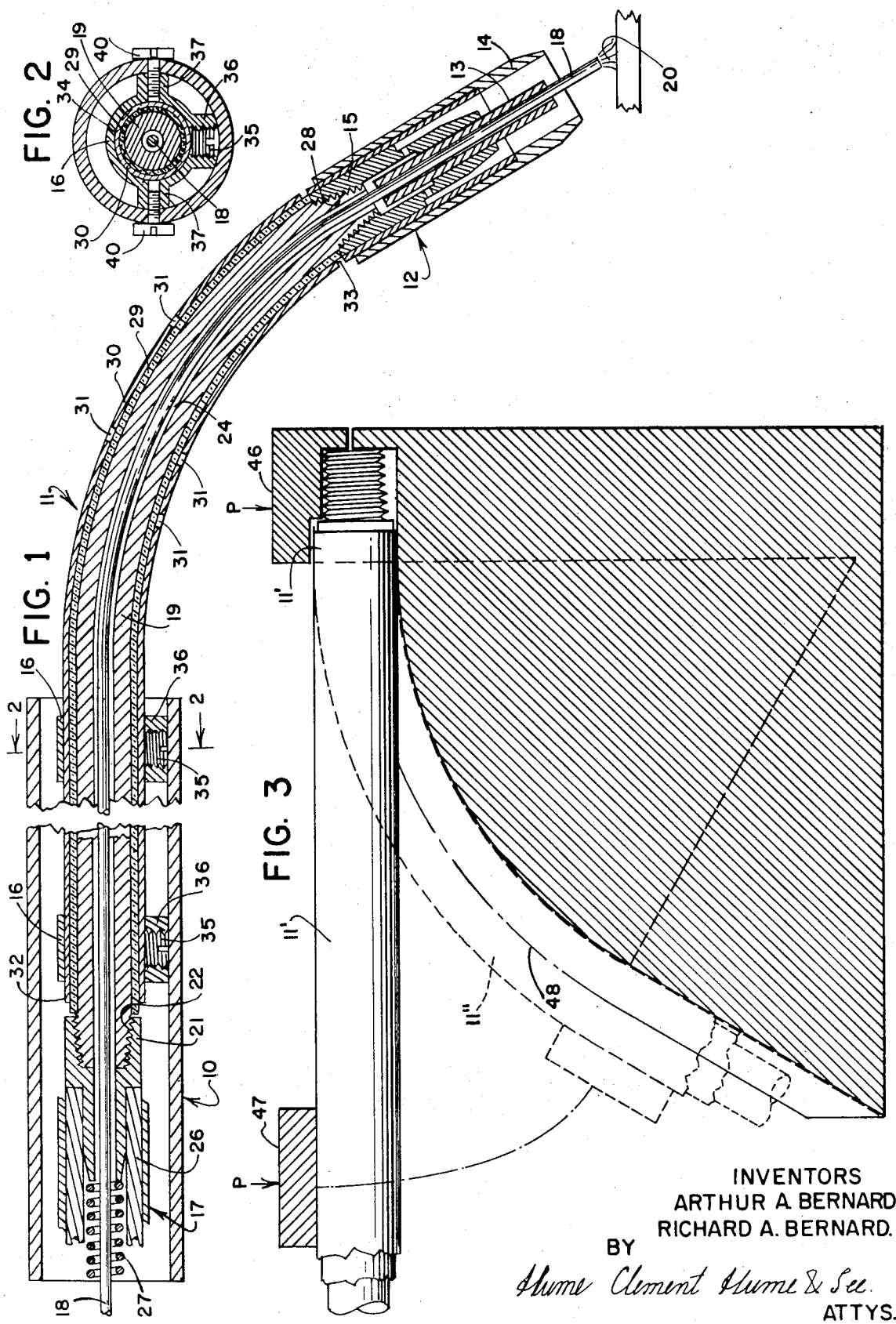

THERMIONIC INSULATED ARC WELDING GUN

This is a division of U.S. application Ser. No. 818,954, filed Apr. 24. 1969, now abandoned.

This invention relates to an air cooled arc welding gun used for applying continuous lengths of consumable electrode mechanically fed through the gun to the welding arc and, more particularly, to an improved means for heat insulating as well as electrically insulating that portion of an air cooled arc welding gun which extends in a curved form between the handle portion of the gun to the head portion commonly called the gooseneck portion. This invention also includes the method of making this improved structure.

Although primarily developed for guns which use a shielding gas from a separate source, this invention is equally valuable when embodied in the construction of arc welding guns used for applying processes where the electrode conveys materials to the welding arc which are converted into the shielding medium when subjected to the heat of the welding arc and, also, for guns used for applying processes commonly called submerged arc welding processes.

In the Bernard et al. U.S. Pat. application, Ser. No. 650,051, filed June 29, 1967, now U.S. Pat. No. 3,469,070 an improved method of heat insulating as well as electrically insulating the head portion of air cooled are welding guns is described and illustrated. However, in that application the method used for shielding the gooseneck portion is conventional and therefore does not provide efficient heat insulating means for shielding the gooseneck portion when the gun is used for handling substantially higher than conventional welding currents.

The main object of this present invention, therefore, is to provide an improved method of insulating the gooseneck portion of arc welding guns so as to handle a higher than conventional range of welding current so that gun type arc welding can be moved up into a higher range of efficiency. In this regard, it is important to understand that the increased volume of welding heat produced by the increased volume of welding current heats the head portion of the gun to a destructive temperature unless the heat absorbed by the head portion is constantly drained from the head portion through the gooseneck portion into the welding current cable connected thereto from which the heat radiates out into surrounding space.

Obviously, when conducting these higher temperatures of heat from the head portion, the gooseneck portion is heated to proportionately higher temperatures so high that the desired higher range of welding efficiency cannot be provided unless the problems caused by these higher heats are solved.

For example, an arc operating at 800 amperes heats the gas nozzle and the welding current contact tip of the head portion to a red hot temperature and, indeed, would greatly exceed even a red hot temperature and melt these parts of the head portion if it were not for the fact that the heat is constantly drained from the head portion through the gooseneck portion into the connected welding current cable. Obviously, the heat drained a temperature which breaks down and destroys conventional insulating materials.

Moreover, it is not enough to merely electrically insulate the outer surface of the gooseneck portion to prevent short circuiting should the gooseneck portion accidentally or intentionally contact the weldment during the welding operation since the volume of heat which radiates from the gooseneck portion can produce a density of ions to ignite an arc between it and the weldment should the gooseneck even come close to the weldment.

Further, a means improved beyond that disclosed in the above referred to pending application had to be developed to shield the handle of the gun from the highly heated gooseneck portion within the handle so that the gun could be handled by the welding operator.

Heretofore, generally, there were two methods used for electrically insulating the gooseneck portion of arc welding guns. In the first of these two methods, the curved gooseneck portion is encased within a tube composed of rubber, silicon rubber, or neoprene, as referred to in the above mentioned pending application. However, these insulating materials either cannot withstand the ultra high temperatures the gooseneck portion is heated to and are thus rendered to a hard brittle state which is fragile and cracks easily, or they have a very short life due to the scuffing to which this portion of the gun is subjected by the welding operator dragging the side of the gun along the surface of the workpiece to steady the arc and hammering this portion of the gun against the weldment to dislodge weld spatter which collects within the mouth of the gas nozzle and on the surface of the welding current contact tip within the nozzle.

In the second method which is used in several makes of guns, the gooseneck portion is electrically insulated by enclosing the curved gooseneck portion within a curved metal tube with a space of about one-sixteenth inch to one-quarter inch between the outer surface of the gooseneck portion and the inner surface of the enclosing tube, and this space is maintained by the use of short length insulating bushings within the space at the ends of the outer tube. For certain makes of guns of this second type, the space between the gooseneck portion and the enclosing tube is used as a channelway for conducting arc shielding gas to the head portion from which the gas flows into the gas nozzle. A typical example of this second method is disclosed in U.S. Pat. No. 3,112,392, dated Nov. 26, 1963. The disadvantages of this second method are more critical than the disadvantages outlined above regarding the first method because the gooseneck portion can reach a temperature so high that the thermionic emission of ions from the gooseneck portion within the outer tube builds up to a density which ignites an arc between the outer surface of the enclosed gooseneck and the inner surface of the outer tube when the outer tube contacts the weldment, and when this happens a small area of the outer tube melts and is ruptured as it is blown outward as the air of shielding gas is expanded by being heated by the arc within the space. Therefore, the following are other important objects of this present invention:

1. To provide a gooseneck portion for an arc welding gun which is insulated by a method that prevents an emission of ions from the heated gooseneck portion dense enough to ignite an arc between the welding current circuit and the base metal should the gooseneck portion closely approach but not actually contact the weldment when the welding circuit is alive.

2. To provide a means for electrically insulating the gooseneck portion of arc welding guns which prevents a direct short circuiting of welding current between the gooseneck portion and the weldment should the gooseneck portion actually contact the weldment when the welding circuit is alive.

3. To suspend the electrical conducting and heat conducting gooseneck portion within the center of space within the handle to provide a circulation of air through the handle while shielding both the suspending means and the inside surface of the handle from the heated gooseneck portion with a layer of material which has high electrical and high heat insulating properties such as tightly woven glass filament cords or asbestos fiber cord, sandwiched between the outer surface of the main tube or trunk of the gooseneck portion and a thin wall outer tube which is not a portion of the welding current circuit and which is shielded from thermionic emission from the welding current circuit.

4. To provide a method for making the gooseneck portion of an arc welding gun by telescoping a straight piece of copper tube or copper pipe into a tight fitting pliable tube made of tightly braided or tightly woven glass filament cords or asbestos fiber cords, telescoping the glass filament tube or asbestos fiber tube into a straight piece of thin wall metal tubing, and then with suitable discs to be clearly described further on, bend the assembly of straight laminated tubes into the radius and degree required to produce the shape of gooseneck desired.

5. To provide a means for electrically insulating the gooseneck portion of arc welding guns which is rugged and can withstand hammering without being destroyed; and 6. To provide a means for insulating the gooseneck portion of arc welding gun which will not be destroyed by the high temperature to which the gooseneck portion is heated when using unusually high welding currents.

These and other objects, features, and advantages of this invention will be better understood by reference to the following description and the drawings in which:

FIG. 1 is a diagrammatic cross-sectional view of an air cooled arc welding gun which embodies the inventive means for electrically insulating and heat insulating the gooseneck portion of the arc welding gun.

FIG. 2 is a cross-sectional view taken across lines 2—2 of FIG. 1.

FIG. 3 illustrates apparatus which may be used for forming the gooseneck portion of this invention.

Referring to the drawings, the arc welding gun illustrated in FIGS. 1 and 2 is the type commonly called an air cooled type and is composed generally of a handle portion 10, a gooseneck portion 11, and a head portion 12. The head portion or assembly 12 comprises a welding current contact tip 13 and a gas nozzle 14 carried on a head member 15. The gooseneck portion 11 is attached to, yet suspended from, the handle portion 10 by two spaced collars 16, each provided with threaded projections 37 for attachment to the handle with screws 40. Attached to the rearward end of the gooseneck portion 11 is a multi-purpose conduit and welding current cable assembly 17 which conducts the welding current, the consumable electrode 18, and the arc shielding gas to the gooseneck portion 11. These three materials are conducted through the gooseneck portion 11 to the head portion 12. The welding current is conducted from the welding cable 17 to the main tube member 19 of the gooseneck portion 11 to the head member 15, to the contact tip 13, and from the contact tip 13 into the welding electrode 18 at the tip of which the current is converted into the welding arc 20. The arc shielding gas (if used) flows through the bore 24 of the copper tube 19 in the space between the electrode 18 and the wall of the bore 24.

Referring now specifically to the gooseneck portion 11 shown in FIGS. 1 and 2, the main tube member 19 has a curved midsection and a straight section at each end, and is made of extra heavy wall copper tube or pipe. The actual size of the tube or pipe is governed by the rated welding current capacity of the welding gun. If the gun is rated for 600 amperes maximum at an 85 percent duty cycle, the main tube member 19 is made from ¼ inch size extra heavy wall copper pipe, more specifically, a copper pipe 0.540 inch O.D. by 0.294 inch I.D. by 0.123 inch wall thickness. The copper pipe 19 is threaded at the end 22 within the handle portion 10 with a tapered ¼ inch national pipe thread for attachment to a fitting 21 to which the spiralled strands of the welding current conductor 26 and the flexible electrode conduit 27 are affixed. The forward end of the copper pipe 19 is also threaded at 28 for attachment to the head member 15.

Before the ¼ inch copper pipe 19 is bent to the required angular extent and radius to produce the desired accurate shape of the gooseneck portion 11, a tightly woven yet pliable glass filament cord tube 29 is telescoped over the ¼ inch size copper pipe 19. Preferably, the wall of the woven glass filament cord tube is not less than one thirty-second inch thick. As previously mentioned, this electrical and heat insulating tube 29 may also be made of asbestos fiber or any other material which has equal heat and electrical insulating properties. To make the gooseneck portion of this invention, it is very important to understand that if the woven glass filaments or asbestos fibers are not woven or compressed tightly enough together, it is necessary to fill the small openings between the woven cords with silicon rubber or some other such compressible and stretchable material which can withstand a temperature of 500 plus degrees Fahrenheit. This silicon rubber in pourable liquid form is applied by dipping or brushing and then permitted to solidify at room temperature into a consistency of ordinary rubber. Then as previously mentioned, the glass filament tube 29 is telescoped into a tight fitting brass or stainless steel tube 30 with a wall about 0.025 inch thick. It is further important to understand that in the upper portion of the 500 to 800 amperage range of current, the heat which is conducted through the gooseneck portion into the connected welding cable can be that high a temperature that even though the fine mesh between the woven glass filament cords is sealed with silicon rubber, a small amount of thermionic emission can penetrate through the insulation, and it is important that the build-up of ions be permitted to escape so that it does not become dense enough to ignite short circuiting between the inner tube 19 and the outer tube 30. To prevent a dense build-up of ions, the thin wall outer tube 30 is provided with perforations 31. The size of perforations 31 need not be larger than 3/32 inch or 1/8 inch diameter spaced at about three-eighths inch or one-half inch lengthwise and circumferentially about the tube 30.

It should be noted in FIG. 1 that the insulating tube 29 extends beyond the opposite ends of the outer tube 30 at 32 and 33. Extensions 32 and 33 are provided to produce dimensions between the ends of the outer tube 30 and the surface of the heated main tube 19 which exceeds the length of the welding arc 20 at the tip of the electrode 18 so that, should the outer tube contact the workpiece when the welding circuit is alive, arcing will not take place at these areas. In other words, in that the dimension of the arc 20 is shorter, the welding current will continue to flow at the shorter arc dimension because it has the least resistance.

Referring now particularly to FIG. 2, it will be noted that the two collars 16 which suspend the gooseneck portion 11 within the center of space within the handle portion 10 are both electrically insulated and heat insulated from the electrically and heat conductive main tube 19 by the glass filament cord tube 29.

In copending application Ser. No. 650,051, now U.S. Pat. No. 3,469,070 the present two inventors claim the invention of providing a circular air duct through the handle of an arc welding gun to disperse heat from around the welding current circuit suspended therein and, therefore, do not claim this feature being a portion of this present invention. However, an important feature of the present invention is the improvement that the heat conductive main tube 19 is also enclosed within the insulating tube 29 which greatly reduces the amount of heat released within the handle portion 10 and, further, the means used for attaching the suspended gooseneck portion 11 from the handle portion 10, namely, by collars 16, is a considerable improvement over that disclosed in the above mentioned copending application.

Still referring to FIG. 2, it will be noted that the outer tube 30 which is insulated from the main copper tube 19 telescopes through a bore 34 of the collars 16 and that collars 16 include internally threaded bosses 36 for set screw 35 which rigidly clamps collars 16 to the outer tube 30 of the gooseneck portion 11. Also included are the projections 37 which are internally threaded for connecting the handle 10 to the gooseneck assembly with screws 40 as previously noted. For reasons which are obvious from the drawings, the attaching screws 40 are electrically insulated and heat insulated from the main tube 19 which conducts the welding current and heat. With the exception of the locations where the four small areas of the projections 37 contact the handle, the gooseneck portion 11 is totally suspended within the center of the space through the handle to provide a duct to convect heat out of the handle 10. In actual practice, the collars 16 are made by extruding aluminum or brass in 10 or 12 foot lengths with the cross-sectional shape shown in FIG. 2, and then cutting the extruded shape into lengths of about nine-sixteenths inch. The collars may also be made of molded glass filament cords or asbestos fiber cords bonded with a silicon material.

Referring now to FIG. 3, this drawing illustrates a very simple yet very efficient method and apparatus for bending the assembly of straight tubes 19, 29, and 30 into the required curvature of the gooseneck portion. The operating principle is quite similar to that of bending conventional conduit used for electric light and electric power wiring. The gooseneck portion is shown in elevation as 11' before bending and in phantom view as 11" after bending. To perform the bending operation, one end of the gooseneck assembly 11' is placed under a first saddle shaped block 46 and by applying pressure P to a second saddle shaped block 47, the assembly 11' is curved around a form fitting die surface 48 which has the radius and the degree of the curvature desired. Actually, the radius of the forming die 48 is slightly less than the actual radius desired to allow for spring-back. To retain the roundness of the tubes 19, 29, and 30 as the assembly 11' is curved to the curvature of the die 48, the die 48 is grooved to form-fit the outside diameter of the thin wall tube 30.

While a specific form of the invention has been described herein, it is to be understood that this is by way of example only and not by way of limitation. It is contemplated that modifications will occur to those skilled in the art within the scope of the appended claims without departing from the spirit of the invention.

It should be noted that the insulating tube 29 may be referred to as a substantially ion-impervious shield or insulator. By this, it is meant that the tube 29 serves to prevent ion concentrations or arc-supporting density in the space occupied by the tube 29. In this sense it may be said that the tube 29 serves to displace ionizing air or gas with a unitary, substantially non-ionizing material. The terms "ion-impervious" and "non-ionizing" do not preclude the de minimus presence or movement of ions in the material of which the tube 29 is formed.

What is claimed is:

1. In an arc welding gun for feeding continuous lengths of consumable electrode in an arc welding process and which includes a handle member having a bore through its total length, the combination therewith comprising: a main tubular trunk for conducting welding current through its wall and consumable electrode through its bore to a head assembly of the arc welding gun, said main tubular trunk having means at a downstream end connecting said main trunk to the head assembly of the arc welding gun, said main tubular trunk extending into the bore of said handle member and having means at an upstream end thereof connecting said main trunk to a welding cable, said main trunk comprising an inner electrically conductive metal tubular member encased within a snug-fitting second tube of unitary electrical insulating and substantially ion-impervious material, said second tube being encased within a third snug-fitting tube of thin gauge metal: and means suspending the portion of said main tubular trunk extending into the bore of said handle member to provide a space between the wall of the bore of said handle member and the outer periphery of said third tube of said main trunk for the circulation of cooling air through the bore of said handle member said suspending means comprising, one or more collars through which said main trunk is telescoped, each of said collars being rigidly attached to the outer periphery of said third tube of said main trunk and having outwardly extending projections spacing said collar centrally within the bore of said handle member and attaching said collar to said handle.

2. In an arc welding gun for feeding continuous lengths of consumable electrode in an arc welding process and which includes a handle member having a bore through its total length, a main tubular trunk for conducting welding current through its wall and the consumable electrode through its bore to a head assembly of the arc welding gun and having a curved midportion and a straight section at an upstream end thereof, an electrically conductive fitting at the upstream end of the main trunk for connection to a welding cable, and means coupling a downstream end of said main trunk to the head assembly of the arc welding gun, the combination therewith of improved means for suspending said straight section at the upstream end of said main trunk within the bore of said handle to enable the circulation of air through said handle bore and around said main trunk comprising: one or more collars through which said main trunk is telescoped and within which said main trunk is rigidly clamped, each of said collars having outwardly extending projections for spacing said collar centrally within said handle bore and attaching said collar to said handle, and an improved main trunk comprising for at least the portion of its length between said head assembly and said collars: an inner metal tubular member encased within a snug-fitted second tube of unitary electrical insulating and substantially ion-impervious material, said second tube being encased within a third snug-fitting tube of thin gauge metal.

3. The invention defined in claim 2 wherein said outwardly-extending projections are internally threaded for receiving screws attaching said collar to said handle and wherein said collar further includes an internally-threaded boss for receiving a set screw rigidly clamping said collar to said main trunk.

4. The invention defined in claim 2 wherein the said third tube of thin gauge metal contains a plurality of perforations along its exposed periphery.

* * * * *

UNITED STATES PATENT OFFICE
CERTIFICATE OF CORRECTION

Patent No. 3,728,514          Dated April 17, 1973

Inventor(s) Arthur A. Bernard and Richard A. Bernard

It is certified that error appears in the above-identified patent and that said Letters Patent are hereby corrected as shown below:

The name of the Assignee should read --Dover Corporation, New York, New York-- instead of "Bernard Welding Equipment Company, Beecher, Ill.".

In the Specification:

Column 1, line 64, after "drained" insert --through the gooseneck portion, in turn, can heat this portion to--.

Column 3, line 28, change "discs" to read --dies--.

Column 3, line 37, change "gun" to read --guns--.

Column 6, line 29, change "or" to read --of--.

In the Claims:

Column 8, line 6, change "snug-fitted" to read --snug-fitting--.

Signed and sealed this 11th day of June 1974.

(SEAL)
Attest:

EDWARD M. FLETCHER, JR.
Attesting Officer

C. MARSHALL DANN
Commissioner of Patents